June 30, 1931.  A. C. WOLLENSAK  1,812,819
DRIVE FOR MOTOR VEHICLES
Filed Oct. 7, 1929  2 Sheets-Sheet 1
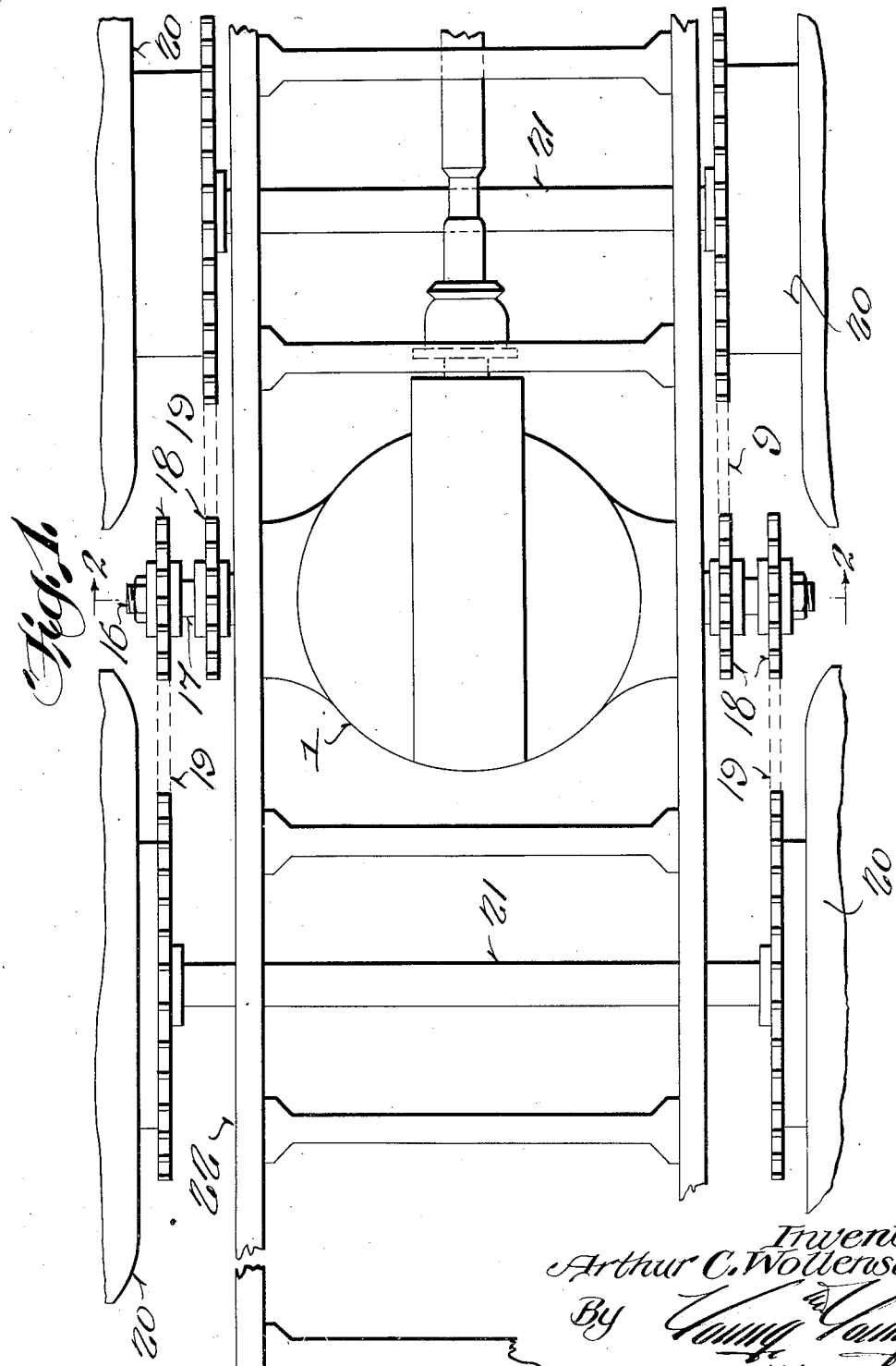
Inventor
Arthur C. Wollensak
By 
Attorneys

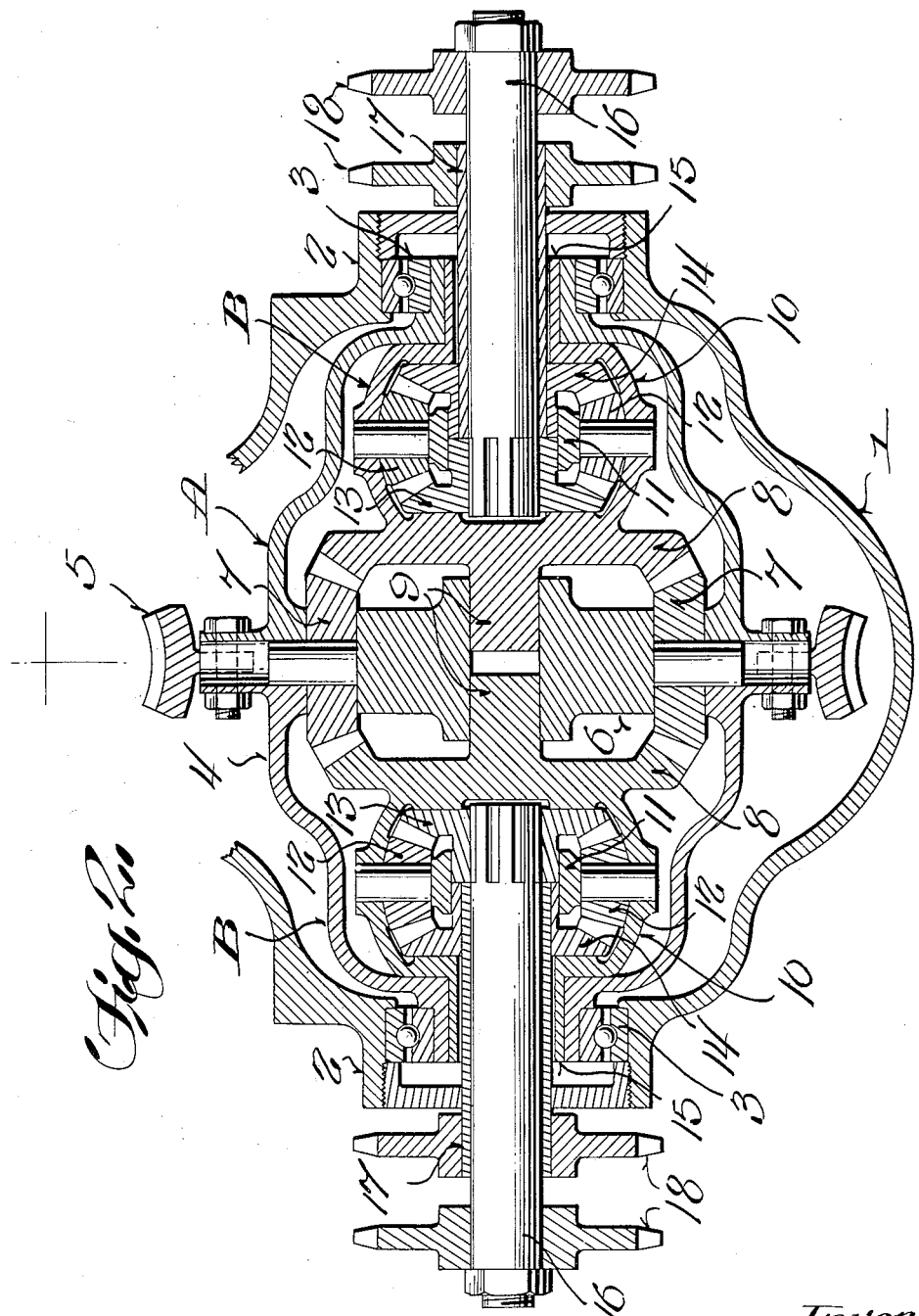

Patented June 30, 1931

1,812,819

UNITED STATES PATENT OFFICE

ARTHUR C. WOLLENSAK, OF MILWAUKEE, WISCONSIN

DRIVE FOR MOTOR VEHICLES

Application filed October 7, 1929. Serial No. 397,938.

This invention pertains to drives for motor vehicles, and more particularly to a differential transmission for four-wheel traction units, such as disclosed in my copending application for six-wheel motor vehicles, filed August 25, 1928, Serial No. 302,052.

In the type of motor driven structure disclosed in the above referred to application, a conventional differential mechanism is employed, utilizing jack shafts connected with the four driving wheels through chain sprocket drives. Obviously, no differential action is provided for between the front and rear drive wheels. Therefore, slippage and unequalled traction occurs, which results in excessive wear upon the tires and deterioration of road surfaces.

The primary object of the present invention resides in the provision of a differential transmission adapted to overcome the foregoing objections and allow for independent driving action of the four traction wheels, thus insuring equalization of the traction and eliminating undue wear upon the tires and road surface.

Incidental to the foregoing, a more specific object resides in the provision of a differential driving mechanism of the foregoing character in which the differential mechanism is entirely housed within a unitary casing, which provides for compactness and minimum cost of manufacture, and also materially facilitates lubrication of the transmission.

A still further object resides in the provision of a differential transmission for four wheel traction units in which a main differential is provided to allow for independent action of the driving wheels upon opposite sides of the vehicle, and in which auxiliary differentials are carried by the main differential to allow independent action between the front and rear driving wheels.

With the above and other objects in view, which will appear as the description proceeds, the invention resides in the novel construction, combination and arrangement or parts substantially as hereinafter described and more particularly defined by the appended claims, it being understood that such changes in the precise embodiment of the herein disclosed invention may be made as come within the scope of the claims:

In the accompanying drawings is illustrated one complete example of the physical embodiment of the present invention constructed according to the best mode so far devised for the practical application of the principles thereof.

In the drawings, Figure 1 is a fragmentary plan view of a portion of a motor driven vehicle illustrating one application of the present invention; and Figure 2 is a transverse section through a differential mechanism constructed in accordance with the present invention, the same being taken on the line 2—2 of Figure 1.

In that form of the present invention illustrated, conventional types of differentials are employed. However, it is to be understood that the principle of the invention may be carried out with other types of differential structures, such as for instance the well-known locking type differential.

In the present structure, the numeral 1 designates a differential housing adapted to encase the entire mechanism in as compact a space as possible, and in which lubrication of the entire mechanism is materially facilitated, there being only one compartment to lubricate.

Journalled in the hub extensions 2 of the housing 1 in the anti-frictional bearings 3, is a differential case 4 which carries a driven gear 5 secured thereto in any conventional manner. In the present instance, the gear 5 is of the worm type, but it is to be understood that the present invention may be applied to any type of drive, such as bevel gear, spiral, or spur gear.

The differential case 4 carries the usual differential spider 6 which in turn carries the cross pinions 7 that engage the differential gears 8, the latter being provided with hub extensions 9 journalled in a central bearing formed in the spider 6. Carried by each of the differential gears 8, or formed integral therewith, is an auxiliary differential case 10 which carries the spiders 11 that in turn carry the cross pinions 12. In addition to the hubs 9 journalled in the spider 6, the auxiliary differential cases 10 are further supported by the hub extensions 15 journalled in the main differential case 4.

The cross pinions 12 engage inner and outer differential gears 13 and 14, respectively. The inner gears 13 have keyed thereto in the usual manner the drive shafts 16, projecting beyond the surrounding sleeves 17, and secured in any suitable manner to the outer gears 14. Both the shafts 16 and the sleeves 17 are provided with sprockets 18 having conventional chain driving connections 19 with the driving wheels 20 mounted upon the axles 21, which may be connected in any suitable manner with the vehicle frame 22. As best shown in Figure 1, the outer sprockets 18, carried by the shafts 16, are connected with corresponding drive wheels, while the inner sprockets are connected with the adjacent set of wheels.

From the foregoing description taken in connection with the accompanying drawings, the operation of the present invention will be readily apparent, in that the usual differential action between the drive wheels upon opposite sides of the vehicle is obtained through the main differential, which may be designated in general by the letter A, while the differential action between the front and rear drive wheels upon either side of the vehicle is obtained through the auxiliary differentials B, which permit independent rotation of the shafts 16 and sleeves 17 carrying the sprockets connected with the rear and front drive wheels, respectively.

It will also be readily seen that the entire differential mechanism is compactly housed with a unitary casing, thus providing a single compartment in which the entire mechanism may be lubricated.

While a specific type of differential has been illustrated and described in some detail, it is contemplated that other well-known types of differentials may be employed, which would require various modifications in the mechanical design. Therefore, such changes and modifications are considered within the scope of the invention, inasmuch as the principle of operation and the results accomplished are not departed from.

I claim:

1. A driving mechanism for vehicles provided with four driving wheels comprising a transverse housing, a driven gear mounted within said housing, a main differential case connected with said driven gear and journalled in said housing, a differential mechanism carried by said main differential case, auxiliary differential cases positioned within said main differential case and connected with the differential mechanism carried thereby, differential mechanisms mounted within said auxiliary cases, a pair of shafts connected with each of said auxiliary differential mechanisms, and driving connections between said shafts and said drive wheels, whereby the latter may rotate independently of each other.

2. A driving mechanism for vehicles provided with four driving wheels comprising a transversely disposed housing positioned between said wheels, a casing journalled in said housing, a driven gear carried by said casing, centrally of said housing, a main differential carried within said casing, auxiliary differentials journalled within said casing upon opposite sides of said main differential, aligned shafts connected with said auxiliary differentials and projecting through the sides of said housing, sleeves mounted on said shafts and connected with said auxiliary differentials, said sleeves being journalled in said housings and projecting beyond the same, and chain and sprocket connections between said shafts and sleeves and their respective driving gears.

In testimony that I claim the foregoing I have hereunto set my hand at Milwaukee, in the county of Milwaukee and State of Wisconsin.

ARTHUR C. WOLLENSAK.